US006502240B1

(12) United States Patent
Naclerio

(10) Patent No.: US 6,502,240 B1
(45) Date of Patent: Dec. 31, 2002

(54) DIGITAL POSTAGE METER SYSTEM HAVING A REPLACEABLE PRINTING UNIT WITH SYSTEM SOFTWARE UPGRADE

(75) Inventor: Edward J. Naclerio, Madison, CT (US)

(73) Assignee: Pitney Bowes Inc., Stamford, CT (US)

( * ) Notice: Subject to any disclaimer, the term of this patent is extended or adjusted under 35 U.S.C. 154(b) by 1015 days.

(21) Appl. No.: 08/560,252

(22) Filed: Nov. 21, 1995

(51) Int. Cl.$^7$ .................................................. G06F 9/44
(52) U.S. Cl. ...................................... 717/170; 705/401
(58) Field of Search ................................. 395/712, 651

(56) References Cited

U.S. PATENT DOCUMENTS

| | | | | |
|---|---|---|---|---|
| 4,813,912 A | | 3/1989 | Chickneas et al. ...... | 364/464.02 |
| 5,075,841 A | | 12/1991 | Kaneko et al. .............. | 395/575 |
| 5,121,432 A | | 6/1992 | Gilham et al. ................. | 380/51 |
| 5,155,847 A | * | 10/1992 | Kirouac et al. .............. | 395/712 |
| 5,257,377 A | * | 10/1993 | Sathi et al ................... | 395/712 |
| 5,379,344 A | | 1/1995 | Larsson et al. ................ | 380/23 |
| 5,473,772 A | * | 12/1995 | Halliwell et al. ........... | 395/712 |
| 5,579,509 A | * | 11/1996 | Furtney et al. .............. | 395/712 |

FOREIGN PATENT DOCUMENTS

| | | | | |
|---|---|---|---|---|
| EP | 0 449 530 A2 | 10/1991 | | |
| EP | 0 522 809 A2 | 1/1993 | ........... | G07B/17/02 |
| EP | 0 649 119 A2 | 4/1995 | ........... | G07B/17/02 |
| EP | 0 718 802 | 12/1995 | ........... | G07B/17/04 |

OTHER PUBLICATIONS

Communication dated Dec. 29, 1999 from European Patent Office.

* cited by examiner

Primary Examiner—Sue Lao
(74) Attorney, Agent, or Firm—Alberta A. Vitale; Angelo N. Chaclas

(57) ABSTRACT

An improved postage meter mailing system utilizes a meter vault operated under the control of a microcontroller mounted in a secure housing. The microcontroller of the meter vault has a communication device for receiving and transmitting data messages and non-volatile memory for storing program data and other data. A printer is utilized for printing a postage indicia. The printer operates under the control of a microcontroller mounted in a secure housing. The microcontroller of the printer has a communication device for receiving and transmitting data messages and non-volatile memory for storing program data and other data. An interface provides a communication path between the meter vault and the printer. The non-volatile memory of the meter vault has stored therein a program version number for identifying the control program version. The non-volatile memory of the printer has store therein a software update number for identifying associated meter vault programs which utilize the update software. Upon system start-up, the print head microcontroller requests the meter vault microcontroller to transmit the control program version and number and determines whether the control program require the update software and if so transmits the update software.

5 Claims, 5 Drawing Sheets

DIGITAL POSTAGE METER SYSTEM HAVING A REPLACEABLE PRINTING UNIT WITH SYSTEM SOFTWARE UPGRADE

BACKGROUND OF THE INVENTION

The present invention relates to a postage metering system that utilizes a digital printer and, more particularly, to a postage metering system wherein the postage metering system includes a meter vault and a replaceable digital printing unit which are physically separated.

Generally, a postage metering system includes a meter vault which accounts for the postage printed by a printing unit. The meter vault is comprised of a programmable microcontroller having a program memory for storing the system control program data. In an attempt to employ digital printer, such as, ink-jet, in the postage metering systems, it has been found that a print module configuration which includes the print heads, drivers and graphic imaging system within a single secure package is desirable. An electronic communication channel is provided between the meter vault and the print module to allow the communication of critical accounting and other data between the meter vault and the print module. This channel may also be used to allow communication between the print module and a mailing machine.

It is conventional practice to provide system software updates from time to time which either correct software defects, increase system efficiencies or add system functionality. Submitting the meter vault to system software updates or modifications has typically been accomplished in one of three ways. Under certain circumstances the meter vault must be taken out of service and returned to the manufacture where the security housing is removed and special equipment is used to load updated software into the program memories of the system. If sufficient unallocated program memory exists, it may be possible to connect a special service device to a communication port of the meter vault and down load the updated software into the program memory or other usable non-volatile memory. The service device must be specially equipped to preserve the security of the meter vault housing and internal circuit security of the meter vault. Another way is to trade out the existing meter vault with a new meter vault. All of these processes represent substantial time and cost consequences.

SUMMARY OF THE INVENTION

It is an objective of the present invention to provide a convenient means of up-dating the control program data for the meter vault and the mailing machine which overcome the time and cost consequences of the conventional processes.

A postage meter system in accordance with the present invention includes a base unit, more commonly referred to as a mailing machine, which serves as a platform for the meter unit. The base includes a microcontroller system which is responsible for controlling the transportation of envelopes in a sequential manner to a printing location whereat the printing unit can print a postage indicia and any other additional information, such as, an ad slogan, delivery address or bar code on the envelope. In a preferred configuration, it is contemplated that printing will accrue during relative motion between the envelope and the printing unit associated with the meter. Therefore, the microcontroller system in the base will be responsible for relatively precise control of the motion of the envelope through the printing location.

The metering is provided by way of two independent units which are a vault and a printer. The vault accounts for and dispenses funds for postal payment. Communication between the mailing machine, vault and printer is facilitated through a printer interface unit. The meter vault communicates with the print head to transfer encrypted messages for postage amount, piece count, and digital tokens. A digital token represents an alphanumeric sequence generated by using any suitable algorithm which uniquely identifies the postage indicia as originating from a particular postage meter system and verifying that that postage meter system is authorized for use by the Postal Authorities. Meter vault communications are routed to the print head through the printer interface. The meter vault securely communicates with the print head using any suitable digital encryption technique.

The printer interface serves as a junction board for the mailing machine, meter vault, slogan box, and print head. This minimizes the number of connection points in the system. The printer interface provides the connections for a serial communication linkage and unregulated DC power from the mailing machine to the meter vault, transfers print command and status signals between the mailing machine and print head, interfaces the slogan box to the print head, supports a unique serial link between the meter vault and print head, and regulates logic and print nozzle power from the mailing machine to the print head.

The slogan box stores graphics images representing the fixed part of the standard indicia (e.g., the eagle printed on US mail), low-value indicia, permit mail indicia, town circle (where appropriate), inscriptions, and customer slogans. It also stores the fonts for printing the variable data on the mail piece. All of the graphics data is either encrypted or signed, that is, subject to other types of encoding algorithms in the slogan box non-volatile memory. The encryption or signing is done at the manufacture's facility. Only the print head contains the necessary decryption key to properly interpret the data.

The communication by the meter vault includes encrypted information. Only the meter vault and the print head know the proper keys to utilize the information. The keys are stored in an ASIC on the print head to reduce the opportunity for fraud. The microcontroller on the print head controls the printing operation including loading of NVM, decoding of messages with assistance of a DES engine on the print head ASIC, and initiating of printing. The microcontroller helps to reduce the complexity of the ASIC.

The print head ASIC decodes the mail position for printer sequencing, provides the proper timing for driving the print nozzles, supports external ink supply monitoring, interfaces to the NVM; support external communications, and performs self-test functions. The print head NVM also stores inscription representations. The meter vault stores a table of enabled inscriptions. When the operator at the mailing machine wishes to select an inscription, the print head transfers a list of the available options to the meter vault. The vault screens for only the enabled inscriptions and sends the information to the mailing machine. The operator's response is forwarded from the meter vault to the print head.

As part of the system start-up process, the print head issues a message to the meter vault which directs the meter vault microcontroller to receive updated program data, only if, that updated program data version has not already been written to the non-volatile memory of the meter vault. The print head then encrypts the updated program data and transmits that encrypted data to the meter vault. The microcontroller of the meter vault then decrypts the updated program data and stores the data in the non-volatile memory of the meter vault. The program update code is loaded into the print module after fabrication by the manufacture and prior to shipment.

DETAILED DESCRIPTION OF THE PREFERRED EMBODIMENT

Figure 1:
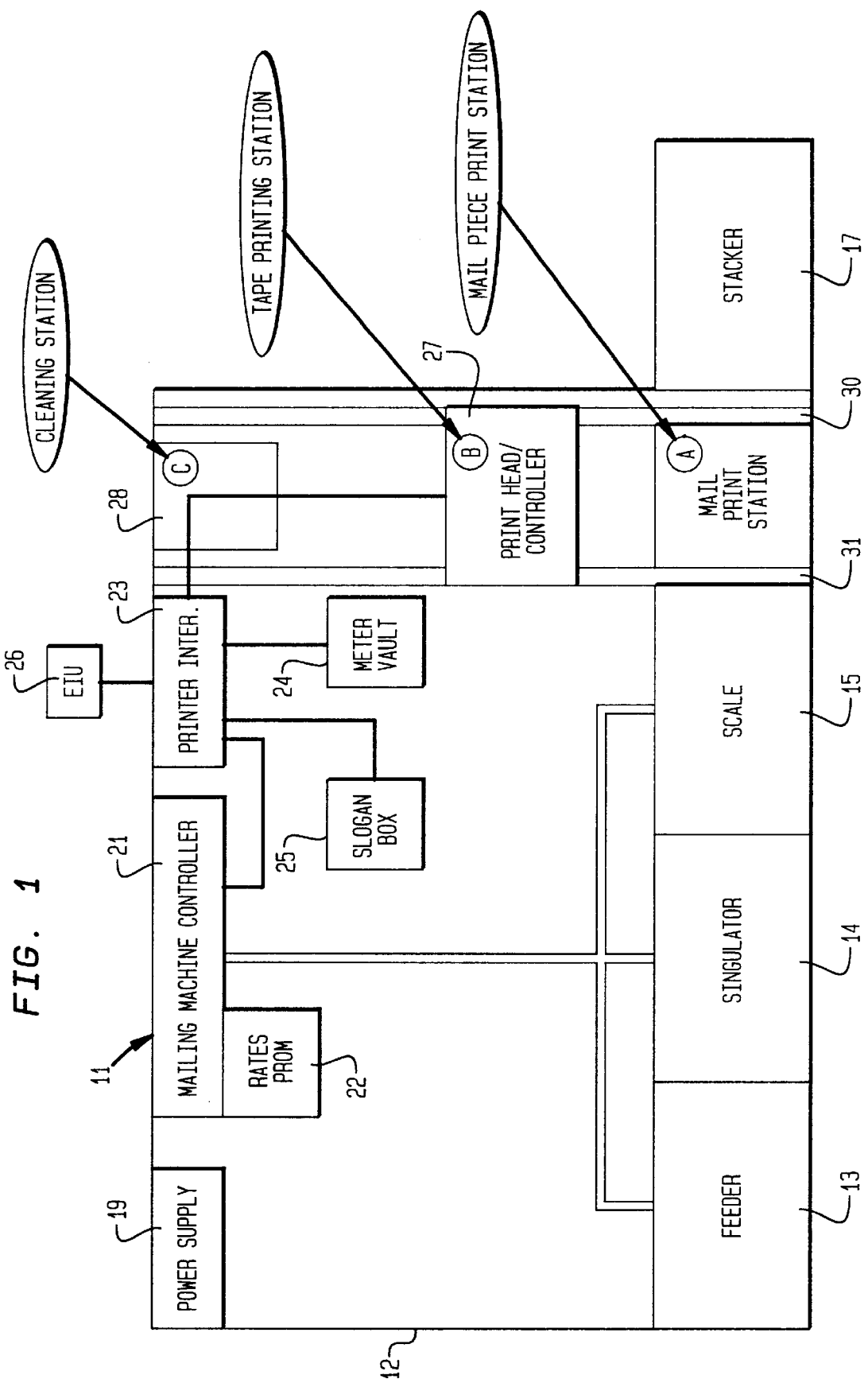
FIG. 1 is a schematic of a postage metering system in accordance with the present invention.

Referring to FIG. 1, the postage meter system, generally indicated as 11, includes a mailing machine base 12. The mailing machine base 12 is of any suitable conventional design and, in the preferred embodiment, includes a feeder section 13, singulator 14 and scale section 15 positioned serially along a mail flow path. Following the scale section 15 is a print station at location A which is followed by a stacker 17. Any suitably designed feeder section 13, singulator section 14, scale section 15 and stacker section 17 may be used. The operation of the respective section 13, 14, 15, and 17 is under the control of a mailing machine controller 21. Power to the system is provided by a conventional power supply 19. It should be appreciated that the mailing machine controller 21, in the preferred embodiment, will control such additional functional systems as the operator keyboard and display, unsecured departmental accounting (not shown) and other convention system functions. As depicted in FIG. 1, a rates programmable read only memory (PROM 22) is detachables mounted to the mailing machine controller 21 to provide rate information to the mailing machine controller in any suitable conventional manner.

Also, housed in the mailing machine is a printer interface 23, slogan box 25, meter vault 24 and print head/controller 27, hereafter referred to as print head 27. The print head 27 is mounted to rails 30 and 31 by any suitable means to be positionable, by any convention means such as by a motor (not shown) between a first position "A" which is the print position, a second position "B" which is a tape print position, and a third position "C" which is a cleaning position. At position "C" the print head 27 is brought into contact with a nozzle cleaning system of any suitable design such that, for example, wherein ink jet print technology is utilized by the print head 27, the nozzles may by cleaned. The positioning of the print head 27 along the rails 30 and 31 is under the control of the mailing machine controller utilizing any suitable conventional control means.

Also, the mailing machine 12 includes provisions for allowing the external interface of a external interface unit (EIU 26) to the printer interface 23 by any conventional means. The EIU 26 provides additional microprocessing functionality to the system 11 utilizing any suitable method.

Figure 2:
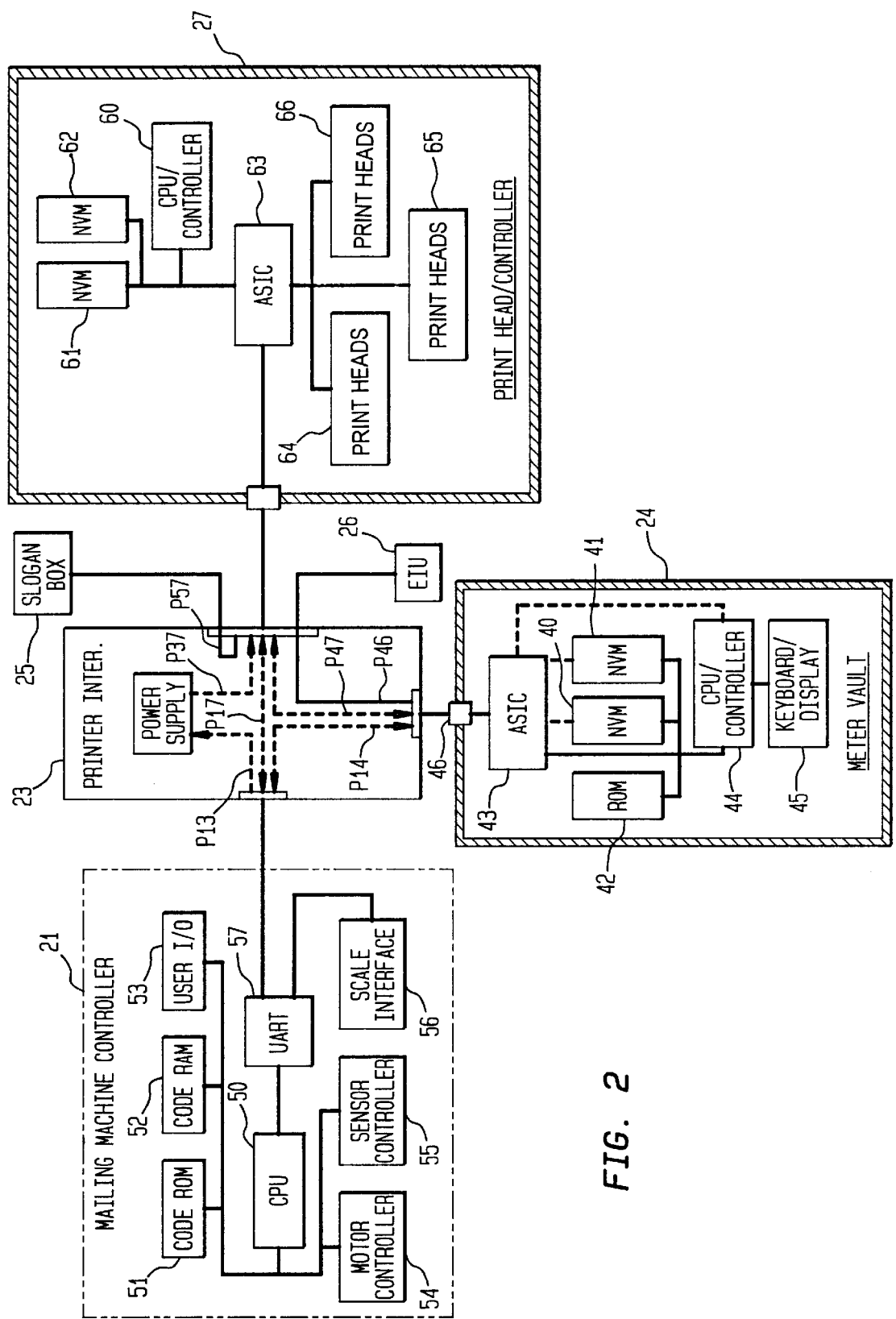
FIG. 2 is a schematic illustration of the communication path between the meter vault, mailing machine and print head units and of the respective control systems in accordance with the present invention.

Referring to FIG. 2, the meter vault 24 includes a source accounting memory 40 and 41, program memory 42, ASIC 43, CPU controller 44, and keyboard/display 45. As more specifically described subsequently, the ASIC 43 provides two RS-232 communications ports 46 in any suitable conventional means for facilitating communications with the mailing machine 21.

The communication port 46 is modified to include an extra pin for receiving DC power from the mailing machine. It should be appreciated that the keyboard and display 45 is provides an operator or postal agent a means of recharging the accounting registers of the accounting memory 40 and 41 through the keyboard in any suitable conventional manner.

The mailing machine controller 21 is comprised of a controller CPU 50, code ROM 51, code RAM 52, user input/output 53, motor controller 54, sensor controller 55. Also provided is a scale interface 56 and UART interface 57. The UART interface 57 is of any conventional design for allowing asychronous serial communication. Of principle concern to the preferred embodiment of the present invention is that the UART interface facilitates communication between the mailing machine controller 21 and the other system units 23, 24, 25, 26 and 27.

The print head 27 is comprised of a CPU controller 60, nonvolatile memory units 61 and 62, ASIC 63 and print units 64, 65, 66. In the preferred embodiment it is contemplated to use multiple ink jet printing units.

Meter vault 24 communications to the print head 27 are routed through the printer interface 23 along communication path P47. The meter vault 24 securely communicates with the print head 27 using DES encryption. A number of encryption keys are preloaded into the ASIC 63 of the print head 27 and ASIC 43 of the meter vault 24. This will make discovering the keys impossible without reverse engineering of the ASIC 43 or 63. Communications path 47 is also used to select inscriptions and slogans in conjunction with the slogan box 25. A printer interface path P46 provided for electrical communication with the EIU 26. As aforenoted, the EIU 26 represents an external unit which can be attached to the meter vault 24 to provide enhanced capability to the meter vault 24 when the meter vault 13 is used in combination with a defeatured mailing machine.

The printer interface 23 serves as a junction board for the mailing machine 21, meter vault 24, print head 27 and a slogan box 25. By providing specific communication pathes P13, P14, P17, P37, P46, P47, P57 within the printer interface 23, the individual subsystems can be isolated in such a manner to remove the necessity for interdependent security measures.

The slogan box 25 stores graphics images representing the fixed part of the standard indicia (e.g., the eagle printed on US mail), low-value indicia, permit mail indicia, town circle (where appropriate), inscriptions, and slogans. It also stores the fonts for printing the variable data on the mail piece. All of the graphics data is either encrypted or signed in the slogan box 25 non-volatile memory (not shown). Only the print head 27 contains the necessary decryption key to properly interpret the data. Because of the different indicia formats, each country will have its own indicia graphics, therefore its own slogan box 25 product code number.

When a new print head 27 is positioned in the mailing machine 17, the controller 21 checks the local NVM 61 and 62; if it is un-initialized, the controller reads the slogan box 25 to retrieve the necessary graphics information. The print head 27 decrypts or verifies this data and programs it into its NVM 61 and 62. In the event that the print head NVM 61 and 62 are smaller than the slogan box NVM, only the subset of graphics necessary for a particular mail run is loaded into the print head NVM 61 and 62. If the NVM 61 and 62 should become corrupted, e.g., fail a checksum test, the controller 60 can request a new memory download as though it were newly installed.

When the mailing machine microcontroller 21 initiates the meter ad selection option as a result of operator selection via the user I/O 53, the slogan box 25 will transfer a text description of each of its slogans to the mailing machine microcontroller 21 through the print head 27 and meter vault 24. Once the operator responds with the selected slogan to print by selection of the appropriate operator key on the mailing machine 11, the slogan box 25 transfers the bit-map slogan image to the print head 27 if it is not already loaded in the print head NVM 61 and 62. The slogan box 25 electrically connects to the print head 27.

The print head 27 prints the indicia including postage amount, digital tokens, piece count, and date as well as an optional inscription and slogan on each mail piece. The fixed part of the image, fonts for the variable parts of the image, and inscription bit-maps are programmed into the print head's NVM 61 and 62 when the print head is first installed in the mailing machine 17. The meter vault 24 will send a message to the print head 27 indicating the format of the town circle. The print head 27 obtains the town circle information as either a text string from the meter vault 24 or a bit map from the slogan box and programs its NVM with the data. For each mail piece, the meter vault 24 transfers the variable indicia information such as the postage amount, digital tokens, meter serial number, and piece count to the print head 27. The print head controller 60 programs registers (not shown) in the ASIC 63 with this information. When the mailing machine microcontroller 21 commands the print head 27 to print, the ASIC 63 combines the fixed and variable parts of the image for printing by the print units 64, 65 and 66 utilizing any suitable technique.

The interface with the meter vault 24 includes encrypted information; only the meter vault 24 and the print head 27 know the proper keys to utilize the information. The keys are stored in an ASIC 63 on the print head 27 and the meter vault ASIC 43.

The controller 60 on the print head 27 controls the printing operation including loading of NVM 61 and 62, decoding of messages and initiating of printing.

The print head ASIC 63 also decodes the mail position for printer sequencing, provides the proper timing for driving the print nozzles, supports external ink supply monitoring, interfaces to the NVM 61 and 62; supports external communications, and performs self-test functions. The print head NVM 61 and 62 also stores inscription representations. The meter vault 24 stores a table of enabled inscriptions when the operator at the mailing machine 11 wishes to select an inscription, the print head 27 transfers a list of the available options to the meter vault 24. The vault 24 screens for only the enabled inscriptions and sends the information to the mailing machine microcontroller 21. The operator response is forwarded from the meter vault 24 to the print head 27.

Figure 3:
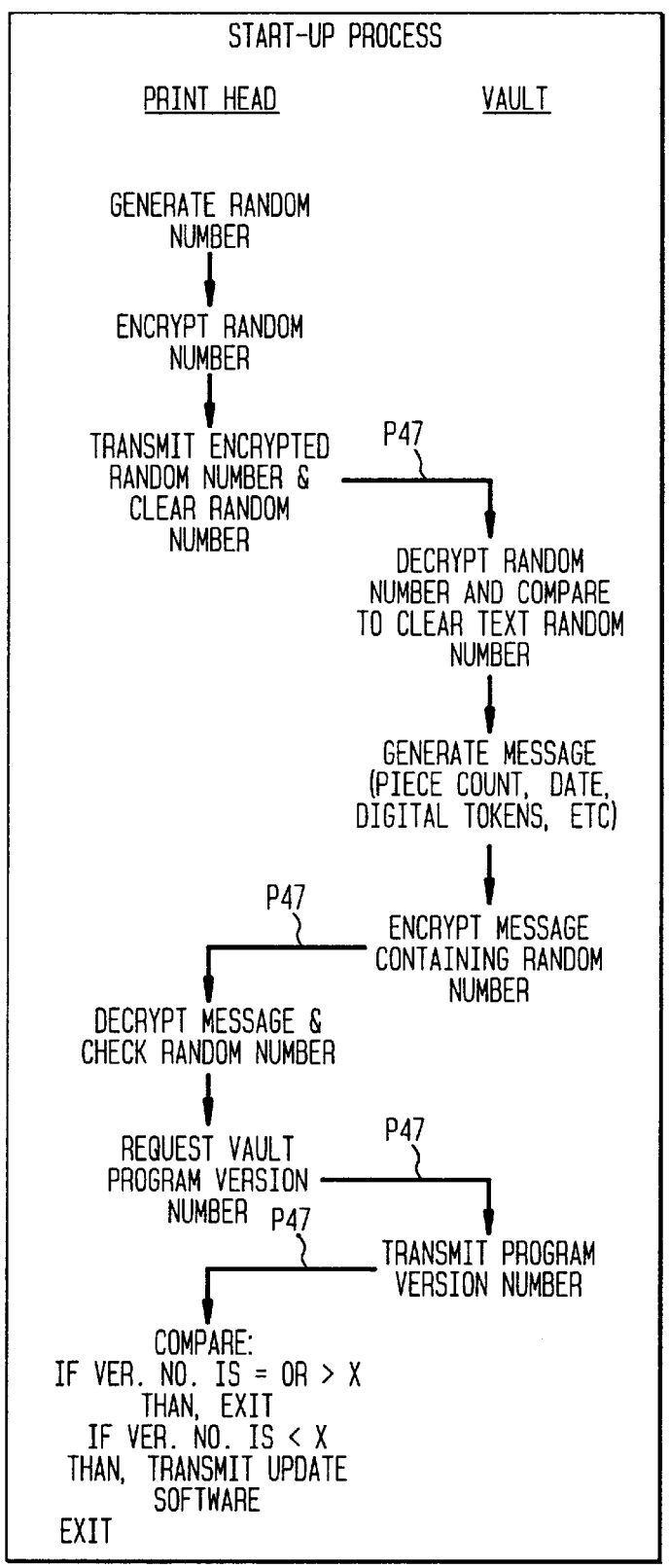
FIG. 3 is a process diagram of the start-up process of the postage meter system in accordance with the present invention.
Figure 4:
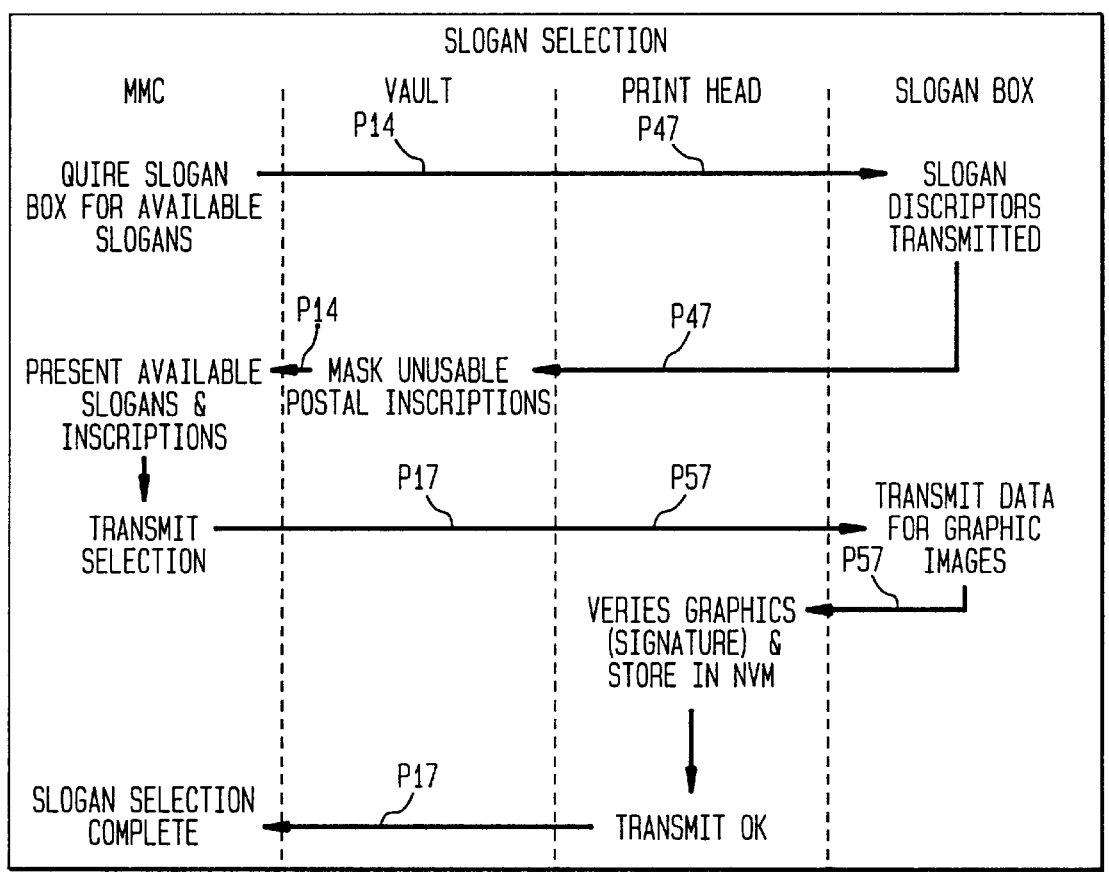
FIG. 4 is a process diagram of the slogan selection process of the postage meter system in accordance with the present invention.
Figure 5:
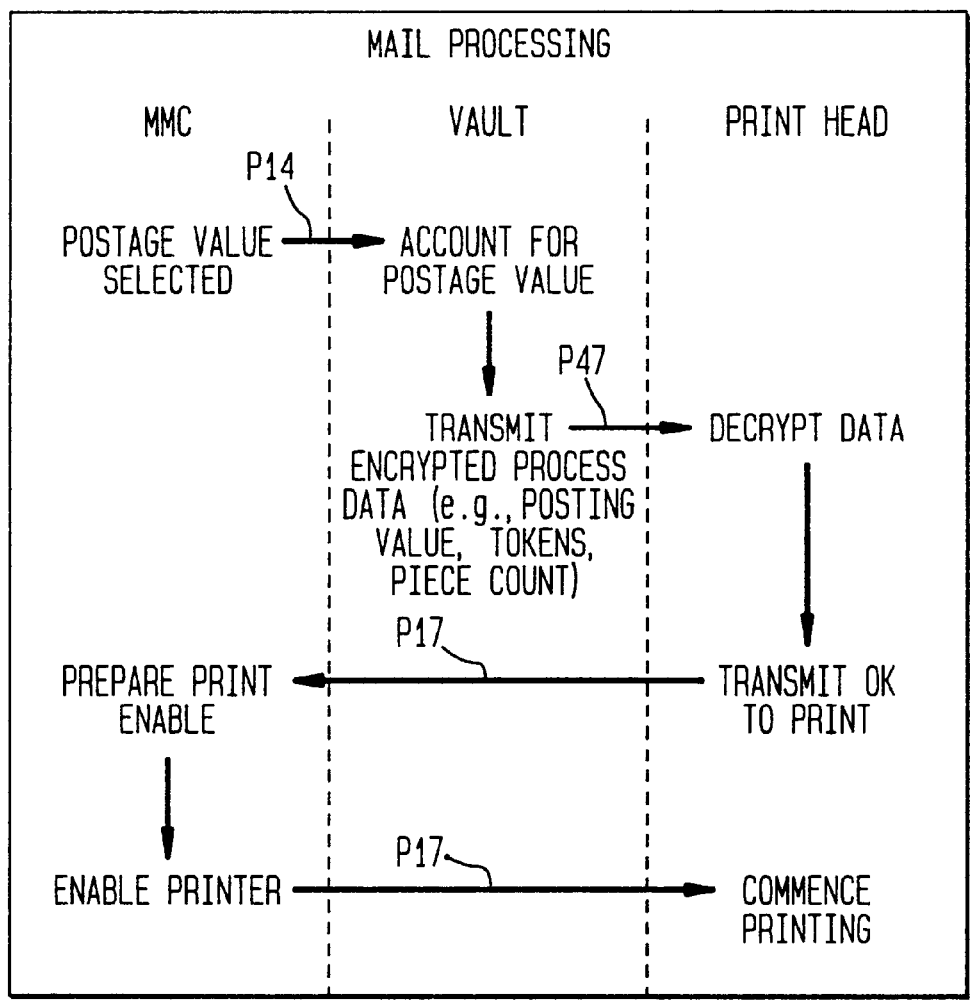
FIG. 5 is a process diagram for mail processing of the postage meter system in accordance with the present invention.

Referring also to FIGS. 3, 4 and 5, it is observed that the meter vault 24 may have any suitable known independent housing and internal security measures as well as the print head 27 may like-wise have independent housing and any suitable internal security since critical communication between the mailing machine controller 21, meter vault 24 and print head 27 are secure communications. Particularly, referring to FIGS. 3, 4 and 5, during the system start-up process, the print head 27 generates a random number which is then encrypted by the ASIC 63. The random number is transmitted via path P47 in the encrypted and clear form to the meter vault 24. The meter vault 24 decrypts the random number and compares with the clear text. If a match is determined, then the meter vault 24 generates a message of critical data including the random number. The meter vault message is encrypted and transmitted along path P47 to the print head 27. The message is then decrypted and, if the random number transmitted matches the generated random number, the encrypted information is stored in NVM 61 and 62 for use in subsequent printing. The print head 27 then transmits a request to the meter vault 24 along path P47 to send the program software version number. In response, the meter vault 24 sends the software version number along path P47 which is received by the print head 27 and compared to a software version number stored in the non-volatile memory 61 or 62 of the print head 27. If the version number transmitted to the print head 27 is equal to or greater than the version number stored in the non-volatile memory 61 or 62 of the print head 27 then the system is ready for normal operation. If the version number transmitted to the print head 27 is less than the version number stored in the non-volatile memory 61 or 62 then the print head 27 transmits the updated program data to the meter vault 24 which stores the updated program data in its non-volatile 40 or 41. The system is now ready for normal operation.

Particularly referring to FIG. 4, in the manner described above, an operator may submit a query to the slogan box 25 for available slogans via paths P14 and P47. The slogan box 25 transmits the slogan descriptor information via path 47 to the meter vault 24 which mask the unusable postal inscriptions. The meter vault 24 than relays the modified message to the mailing machine controller 21 for presentation to the requester. The requester than may a selection which the mailing machine controller 21 transmit via path P17, P57 to the slogan box 25. The slogan box 25 then transmits the data for the graphic image via path P57 to the print head 27 which stores the graphic information in the memories 61 and 62. The print head 27 then transmits via path P17 an information received to the mailing machine controller 21.

Referring now to FIG. 5, to process mail items, a postage value is either operator selected or determined based upon data from the scale 15 via the scale interface 56. The mailing machine controller 21 transmits the appropriate postage value to the meter vault 24 via path P14 which then accounts for the postage value. The meter vault 24 then encrypts the critical accounting data and transmit the encrypted data via path P47 to the print head 27 where the data is decrypted. Once the data is successfully decrypted, the print head 27 transmits an OK to print to the mailing machine controller 21 via path P17. Upon receipt of the OK message from the print head 27, mailing machine controller 21 then transmits along path P17 a print enable and printing is commenced.

It should now be appreciated that the afore described system provides the benefit of unlacing system security and provides a method of generating secure communications between system units.

What is claimed is:

1. An improved postage metering system of the type having a meter vault including a memory for storing a meter vault software program having a version number, wherein the improvement comprises:

means for determining the version number of the meter vault software program;

means for comparing the detected version number with a desired version number;

means for transmitting a new meter vault software program to the meter vault to replace the meter vault software if the detected version number is earlier in sequence than a desired version number;

a printer including a microcontroller and a memory; and interface means for providing communication between the meter vault and the printer;

wherein the meter vault includes a microcontroller for decrypting the new meter vault software program prior to the new meter vault software program being stored in the memory of the meter vault;

wherein the new meter vault software program is necessary to establish proper communications between the meter vault and the printer for operation of the postage meter system and the new meter vault software program is located in the memory of the printer during manufacture of the printer and prior to installation of the printer into the postage meter system;

wherein the determining means determines the version number of the meter vault software program during each start-up routine for the postage meter system; and wherein the microcontroller of the printer encrypts the new meter vault software program prior to transmitting the new meter vault software program to the meter vault.

2. An improved postage meter mailing system, having a meter vault including a microcontroller, said microcontroller of said meter vault having a communication means for receiving and transmitting data messages and a memory for storing program data, a printer including a microcontroller, said microcontroller of said printer having a communication means for receiving and transmitting data messages and a memory storage means for storing program data, interface means for providing a communication path between said meter vault and said printer, wherein said improvement comprises:

said memory of said meter vault having stored therein data representing a numeric version of said program data;

said memory of said printer having stored therein program update data and a data representing an associated numeric version for identifying associated program data;

said print head microcontroller having means for requesting said meter vault microcontroller to transmit said data representing said numeric version of said program data and comparing said data representing said numeric version with said data representing said associated numeric version, wherein, only if, said numeric version is less than said associated numeric version said print head microcontroller transmits said update data to said meter vault to replace said program data;

wherein said print head microcontroller requests said meter vault microcontroller to transmit said data representing said numeric version of said program data, compares said data representing said numeric version with said data representing said associated numeric version, and, only if, said numeric version is less than said associated numeric version transmits said update data to said meter vault during each start-up routine for the postage meter mailing system;

said microcontroller of said printer encrypts said update data prior to transmitting said update data to said meter vault;

said microcontroller of said meter vault decrypts said update data prior to said update data being stored in said memory of said meter vault; and said update data is loaded into said memory of said printer during manufacture of said printer and prior to installation of said printer into said postage meter mailing system.

3. The improved postage meter system of claim 2, wherein:

said update data is necessary to establish proper communications between said printer and said meter vault for operation of the postage meter mailing system.

4. A method of updating program software of a postage meter system having a meter vault including a microcontroller, said microcontroller of said meter vault having a communication means for receiving and transmitting data messages and a memory for storing program data, a printer including a microcontroller, said microcontroller of said printer having a communication means for receiving and transmitting data messages and a memory for storing program data, interface means for providing a communication path between said meter vault and said printer, said method comprising the steps of:

storing numeric data in said memory of said meter vault representative of said program data version, storing program update data in said memory of said printer, storing associated numeric data in said memory of said printer representative said program data version associated with said program update data, comparing said associated numeric data in said printer memory to said numeric data in said meter vault memory transmitting said update data to said meter vault, only if, said associated numeric data is greater than said numeric data;

performing each of the steps previously recited during each start-up routine for the postage meter mailing system;

encrypting said update data prior to transmitting said update data to said meter vault;

decrypting said update data prior to said update data being stored in said memory of said meter vault; and storing said update data into said memory of said printer during manufacture of said printer and prior to installation of said printer into said postage meter mailing system.

5. The method of claim 4, further comprising the steps of:

using said update data to establish proper communications between said printer and said meter vault for operation of the postage meter mailing system.

* * * * *